Dec. 14, 1965    G. W. MOREY    3,223,553
ELECTRICAL INSULATING GLASS COMPOSITION AND
APPARATUS ENCAPSULATED THEREWITH
Filed Jan. 10, 1962
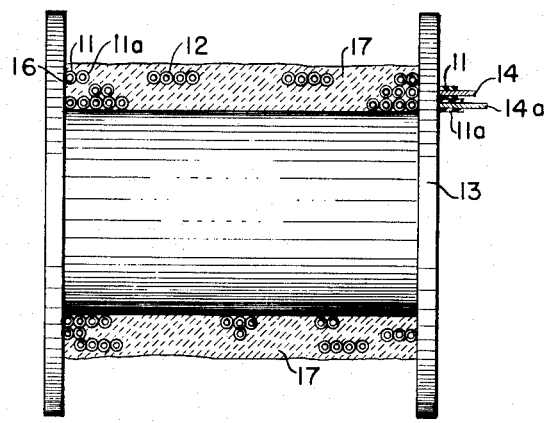
INVENTOR.
GEORGE W. MOREY
BY
HIS AGENT

United States Patent Office 3,223,553
Patented Dec. 14, 1965

3,223,553
ELECTRICAL INSULATING GLASS COMPOSITION AND APPARATUS ENCAPSULATED THEREWITH
George W. Morey, Bethesda, Md., assignor, by mesne assignments, to Anaconda Wire and Cable Company, a corporation of Delaware
Filed Jan. 10, 1962, Ser. No. 165,392
4 Claims. (Cl. 117—215)

My invention relates to a glass composition and particularly to such compositions for insulating electrical apparatus and to apparatus insulated therewith.

In the manufacture of electrical apparatus such as but not limited to transformer coils and motor windings it has long been known to coat the wires forming the windings with an insulating enamel, wind the enamelled wire into coils, and then encapsulate or set the coils with an insulating varnish. However, the operating temperatures of these known coils have necessarily been limited by the organic nature of the enamel and varnish and there has lately been much interest in windings that remain operable at temperatures as high as 500° C. and even higher. There have been various suggestions made for insulating wires for high temperature service such as the application of metal oxide, particularly aluminum oxide coatings and winding with refractory glass fibers. The temperature advantage of using such refractory coatings is, of course, lost if known types of organic varnish are employed to encapsulate the coils and it is an object of my invention to furnish a glass coating with excellent electrical properties at temperatures in excess of 500° C. that can be used to bind or encapsulate windings insulated for service at these temperatures. Such a binder must have a melting point low enough to fuse in place without melting the primary wire insulation or the conductor but high enough to remain effective at the high operating and overload temperatures to which the apparatus may be subjected. It must have a high order of chemical stability at high temperature and must retain its electrical properties. This has been a particular problem in apparatus designed for normal operation at relatively low temperatures but expected to retain electrical integrity during emergencies when it is subjected to high temperatures. Such apparatus may contain organic components that decompose in an emergency and have a reducing action on the metallic oxides of the glass composition. This reduction may form an electrically conducting oxide or even a metal and so reduce the resistivity of the glass compound as to render it useless. The compound of my invention has overcome this problem.

I have found also that certain glasses, such as lead glasses precipitate the metallic form of the element at elevated temperatures when they are in the presence of another metal, such as nickel, which is commonly used as the outer metallic layer of conductors for high temperature service.

The glass composition of my invention which has overcome all the aforementioned problems consists, on an oxide basis of

| | Parts by weight |
|---|---|
| $Li_2O$ | 0–7 |
| $Na_2O$ | 5–13 |
| $K_2O$ | 5–8 |
| $Fe_2O_3$ | 10–20 |
| $Al_2O_3$ | 1.5–5 |
| $B_2O_3$ | 15–24.2 |
| $P_2O_5$ | 8–12 |
| $SiO_2$ | 10–30 | and I have invented an electric apparatus comprising at least one electrical conductor, refractory insulation coating the conductor, a fused encapsulant of the above composition covering the coated conductor.

A more thorough understanding of my invention may be obtained by reference to the appended drawing.

In the drawing the figure is an elevation of a coil made to my invention. A plurality of turns of paired wires 11, 11a coated with a refractory inorganic insulating layer 12 are wound on a ceramic spool 13 with inside leads 14, 14a of the wire projecting through the flange of the spool 13. The wires 11, 11a with insulating layer 12 form turns 16 capable of operating at very high temperatures. Over the outer layer of the turns 16 the coil is covered with a sealing layer 17 of glass encapsulant which effectively excludes moisture and other contaminants from the coil and guards it from abrasion. The encapsulant 17 may be applied by melt spraying or dipping or it may be applied by repeated sprayings or dippings of a slip or slurry containing the encapsulant in suspended form, followed by a fusion at high temperature. The encapsulant of my invention fuses at a temperature between 600 and 850° C.

*Example*

A glass was compounded with the formula, on an oxide basis, of:

| | Parts by weight |
|---|---|
| $Li_2O$ | 5 |
| $Na_2O$ | 13 |
| $K_2O$ | 8 |
| $Fe_2O_3$ | 20 |
| $Al_2O_3$ | 3.6 |
| $B_2O_3$ | 24.2 |
| $P_2O_5$ | 12 |
| $SiO_2$ | 14.2 |

The glass of the example was applied as the encapsulant 17 in the form of a molten spray and held in an oven at a temperature above its fusion point until it had fused to form an unbroken surface. The insulation resistance was then measured between the wires 11 and 11a at a temperature of 500° C. and the coil was found to be free from short circuits and the insulation retained a high electrical resistivity.

I have also discovered that the electrical properties of my glass composition are particularly good when the weight and percentage of $Na_2O$ is approximately equal to the weight percentage of $K_2O$ in the compound within the preferred limits.

I have invented a new and useful composition of matter and apparatus for which I desire an award of Letters Patent.

I claim:
1. An electrical insulating glass composition consisting on an oxide basis of:

| | Parts by weight |
|---|---|
| $Li_2O$ | 0–7 |
| $Na_2O$ | 5–13 |
| $K_2O$ | 5–8 |
| $Fe_2O_3$ | 10–20 |
| $Al_2O_3$ | 1.5–5 |
| $B_2O_3$ | 15–24.2 |
| $P_2O_5$ | 8–12 |
| $SiO_2$ | 10–30 |

2. An electrical insulating glass composition consisting on an oxide basis of approximately:

| | Parts by weight |
|---|---|
| $Li_2O$ | 5 |
| $Na_2O$ | 13 |
| $K_2O$ | 8 |
| $Fe_2O_3$ | 20 |
| $Al_2O_3$ | 3.6 |
| $B_2O_3$ | 24.2 |
| $P_2O_5$ | 12 |
| $SiO_2$ | 14.2 |

3. An electric apparatus comprising an electrical conductor, refractory insulation coating said conductor, a fused encapsulant covering said coated conductor said encapsulant consisting on an oxide basis, of

| | Parts by weight |
|---|---|
| $Li_2O$ | 0–7 |
| $Na_2O$ | 5–13 |
| $K_2O$ | 5–8 |
| $Fe_2O_3$ | 10–20 |
| $Al_2O_3$ | 1.5–5 |
| $B_2O_3$ | 15–24.2 |
| $P_2O_5$ | 8–12 |
| $SiO_2$ | 10–30 |

4. An electric apparatus comprising at least one electrical conductor, refractory insulation coating said conductor, a fused encapsulant covering said coated conductor said encapsulant consisting, on an oxide basis, of

| | Parts by weight |
|---|---|
| $Li_2O$ | 0–7 |
| $Na_2O$ | 5–13 |
| $K_2O$ | 5–8 |
| $Fe_2O_3$ | 10–20 |
| $Al_2O_3$ | 1.5–5 |
| $B_2O_3$ | 15–24.2 |
| $P_2O_5$ | 8–12 |
| $SiO_2$ | 10–30 |

References Cited by the Examiner

UNITED STATES PATENTS

| | | | |
|---|---|---|---|
| 2,590,894 | 4/1952 | Sanburn | 106—48 X |
| 2,735,024 | 2/1956 | Kulcsar | 106—46 |
| 2,887,394 | 5/1959 | Bickford et al. | 106—46 |
| 3,017,279 | 1/1962 | Van Dolah et al. | 106—48 |
| 3,030,257 | 4/1962 | Whearley et al. | 174—122 |
| 3,035,115 | 5/1962 | Heckel | 174—121 |
| 3,035,928 | 5/1962 | Searight | 106—54 |

JOHN F. BURNS, *Primary Examiner.*

JOHN P. WILDMAN, E. JAMES SAX, *Examiners.*